May 19, 1970
R. F. RAYMOND
3,513,217
OLEFIN PRODUCING PROCESS
Filed Sept. 16, 1966
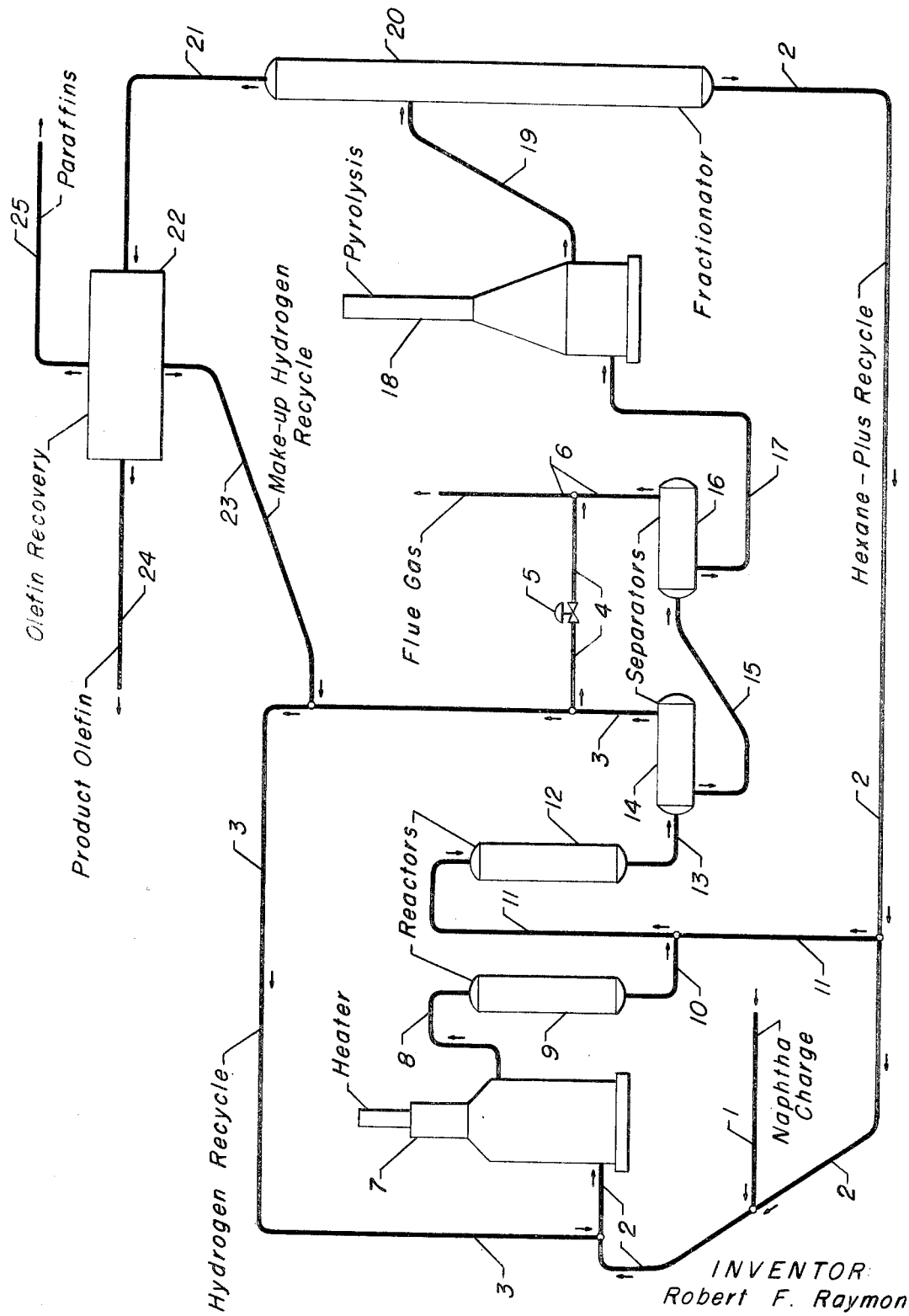
INVENTOR
Robert F. Raymond
BY: James R. Hootson, Jr.
Robert W. Erickson
ATTORNEYS

United States Patent Office 3,513,217
Patented May 19, 1970

3,513,217
OLEFIN PRODUCING PROCESS
Robert F. Raymond, Des Plaines, Ill., assignor to Universal Oil Products Company, Des Plaines, Ill., a corporation of Delaware
Filed Sept. 16, 1966, Ser. No. 579,915
Int. Cl. C10g 23/00; C07c 11/02
U.S. Cl. 260—683
8 Claims

ABSTRACT OF THE DISCLOSURE

Olefins can be produced by catalytically hydrogenating an aromatics-containing feedstock and thereafter thermally cracking same.

---

This invention relates broadly to a process for producing olefinic hydrocarbons, and more particularly to the production of olefins via thermal cracking or pyrolysis of higher molecular weight hydrocarbons. More specifically, my inventive concept is directed toward a novel combination process for producing olefinic hydrocarbons from a hydrocarbon charge stock containing aromatic hydrocarbons, and long chain mono- and di-olefinic hydrocarbons. My invention is uniquely advantageous when adapted to a process for processing hydrocarbon charge stocks to produce high yields of low molecular weight olefins—i.e., those containing less than six carbon atoms per molecule.

Low molecular weight olefins have wide-spread utilization in commercial industries, and the extensive use thereof in the petroleum, petrochemical, heavy chemical, pharmaceutical, and plastics industries, has resulted in an ever-increasing demand for ethylene, propylene butylenes, isobutylenes, butadiene, pentenes and iso-pentenes. For example, ethylene is used as the principal source of ethyl and ethylene compounds including ethyl alcohol, ethylene dichloride and especially polyethylene. Ethylene is further extensively utilized for the production of alkylaromatic hydrocarbons such as ethylbenzene, the principal use of which resides in the manufacture of styrene.

Propylene is used in the manufacture of isopropyl alcohol, propylene dimer, trimer and tetramer, in the production of cumene, polypropylene, and in the synthesis of isoprene. Butene-1, cis-butene-2, and trans-butene-2 are primarily employed in polymer and alkylate gasolines, in the manufacture of polybutenes, butadiene, aldehydes, alcohols, as cross-linking agents for various polymers, and in the synthesis of various $C_4$ and $C_5$ derivatives. Iso-butene is used in the production of isooctane, butyl rubber, poly-isobutene resins, tertiary butyl chloride, copolymer resins with butadiene, acrylonitrile, etc. Pentenes are generally employed in organic synthesis, although alpha-n-amylene (1-pentene) is often used as a blending agent component for high antiknock motor fuel.

One commercially feasible and attractive route to the production of desirable light olefinic hydrocarbons is the process of thermal cracking (often referred to as pyrolysis) of hydrocarbons and mixtures of hydrocarbons. This pyrolysis process is well-defined within the literature and prior art, and no claim is herein made solely with respect to the thermal cracking process. The pyrolysis of hydrocarbons is generally conducted at elevated temperatures of from about 1000° F. to 1500° F., although with the heavier charge stocks, temperatures up to about 2000° F. are employed. The cracking chamber is usually maintained at superatmospheric pressure up to about 100 p.s.i.g.; lower pressures have been shown to be applicable, and are within the range of from 0 p.s.i.g. to about 30.0 p.s.i.g. A wide variety of charge stocks may be, and have been, subjected to thermal cracking to convert the same into lower boiling hydrocarbons rich in olefins. Among such charge stocks are substantially pure ethane, butane, propane and pentane streams, and mixtures thereof; light naphtha fractions containing normally liquid hydrocarbons having an end boiling point of about 280° F. to about 300° F.; heavy naphtha fractions, having an initial boiling point above about 250° F. and an end boiling point up to about 425° F.; full boiling range naphtha fractions; and, in many instances, kerosene fractions boiling up to about 500° F.

A typical pyrolysis, or thermal cracking process involves the separation of the cracked effluent into light and heavy ends or fractions, with the light material, containing the desired olefinic products, being passed through a complex fractionation train to recover the several desired olefin streams. Any paraffins in the light portion of the cracked effluent, separated therefrom in the "olefin recovery" system, may be recycled directly to the cracking zone for additional conversion. Such a scheme is entirely suitable when the charge stock comprises substantially normally gaseous hydrocarbons—i.e., butanes and lighter. Also, few problems arise with a pyrolysis charge containing pentanes, considered to be normally liquid hydrocarbons. However, in the case of charge stocks containing substantial amounts of normally liquid hydrocarbons, such as light and heavy naphtha fractions, and especially kerosene boiling range fractions, the direct recycle of the unconverted portion of the charge stock presents particular difficulty. The principal factor giving rise to the difficulty involving direct recycle, residues in the inclusion therein of aromatic hydrocarbons, long chain mono-olefins and long chain di-olefins—i.e., those having six or more carbon atoms per molecule. Furthermore, many of the charge stocks designated for thermal cracking processing contain high molecular weight sulfurous and/or nitrogenous compounds.

An object of the present invention is to produce the maximum possible yield of olefinic hydrocarbons from charge stocks containing aromatic hydrocarbons.

Another object is to facilitate the recovery of the desired olefinic product from the pyrolysis of hydrocarbonaceous material containing sulfurous compounds in addition to aromatic compounds, through the elimination of subsequent acid-gas removal facilities.

A principal object of my invention is to provide a combination process for pretreating the pyrolysis charge stock, thermal cracking the treated charge and treating that portion of the thermally cracked liquid effluent not usually recycled to the pyrolysis unit.

Thus, in a broad embodiment, the present invention is directed toward a process for producing olefinic hydrocarbons which comprise the steps of: (a) treating a hydrocarbon charge stock containing aromatic hydrocarbons, in contact with a catalytic composite containing a hydrogenation metallic component, and at conditions selected to saturate aromatic hydrocarbons; (b) separating the resulting treated effluent to provide a hydrogen-rich gaseous phase and a liquid phase; (c) recycling said gaseous phase, at least in part, to combine with said charge stock; (d) subjecting said liquid phase to thermal cracking at conditions selected to convert a greater proportion of said liquid phase into lower boiling hydrocarbons; (e) removing a hydrocarbon stream substantially free of hexane and heavier hydrocarbons from the thermally-cracked product effluent; and, (f) separating said stream into a hydrogen-rich gaseous phase, recycling and gaseous phase to combine with said charge stock, and recovering olefinic hydrocarbons from the remainder of said stream.

The foregoing objects are also attained through the practice of a more limited embodiment which involves a process for producing olefins which comprises the steps of: (a) treating a hydrocarbon charge stock containing aromatic hydrocarbons and long chain di-olefinic hydrocarbons, in contact with a catalytic composite containing a Group VIII hydrogenation metallic component, and at conditions including a temperature in the range of from about 150° F. to about 850° F. and a pressure of from about 300 to about 2500 p.s.i.g., said conditions selected to saturate aromatic hydrocarbons and di-olefinic hydrocarbons; (b) separating the resulting treated effluent at a pressure substantially the same as that at which said treating is conducted, to provide a hydrogen-rich gaseous phase and recycling the latter to combine with said charge stock; (c) further separating the remainder of said treated effluent at a reduced pressure below about 50 p.s.i.g. to remove normally gaseous components having fewer than about three carbon atoms per molecule; (d) thermal cracking the remaining portion of the treated effluent at a temperature of from about 1200° F. to about 1500° F.; (e) removing an olefin-rich, normally gaseous stream, substantially free from hydrocarbons containing more than six carbon atoms per molecule, from the thermally-cracked product effluent; (f) separating said gaseous stream to provide a hydrogen-rich gas and recycling the same to combine with said charge stock; and, (g) recycling at least a portion of the remaining cracked product effluent to combine with said charge stock.

Various other embodiments of my inventive concept, its applicability to olefin producing processes, and the many singular advantages afforded through its use will become apparent in view of the following discussion.

The ever-increasing demand for low molecular weight olefins having up to and including four carbon atoms per molecule, and in many instances for pentenes, have caused a present-day trend toward increased thermal cracking capacity with the concomitant desire for increased yields. Many pyrolysis charge stocks are now of the naphtha variety, virtually all of which contain aromatic hydrocarbons, and many of which also contain at least one contaminant from the group of sulfurous compounds, nitrogenous compounds and mixtures thereof. Aromatic hydrocarbons, as a result of their refractory nature, contribute insignificantly, or not at all, to the low molecular weight olefin yield, as a result of their resistance to cracking. Usually, the pyrolysis of a light naphtha fraction results in a pentane-and-heavier "gasoline" fraction in an amount of about 20.0% to 30.0% of the charge stock, of which 60.0% to about 85.0% constitute aromatics. With a heavy naphtha, or kerosene fraction, higher amounts of this pyrolysis gasoline byproduct are obtained. In addition, to a high concentration of aromatic hydrocarbons, this gasoline byproduct contains significant quantities of olefins and di-olefins, and, when the fresh charge contains sulfur, considerable amounts of sulfurous compounds. Although endowed with a high octane rating by virtue of its aromaticity and olefinicity, the pyrolysis byproduct is very unstable, and can be used in motor fuel blends only in limited low concentrations, or only after suitable stabilization treating.

Severe hydrotreating to eliminate the sulfurous compounds and to saturate the olefins and di-olefins, significantly reduces the octane rating. Although mild hydrotreating effects some stabilization, the sulfur concentration is not appreciably reduced and there is some loss in octane rating. Aromatics recovery is often not commercially attractive from an economic viewpoint, and the gasoline byproduct must then be disposed of at fuel value. The current trend in pyrolysis operations is toward higher operating severity in order to increase the light olefin yield per unit of naphtha feed. The unwanted gasoline boiling range byproduct is accepted in as small a yield as possible commensurate with the light olefin requirements, and is disposed of in the best manner available in a given situation. The combination process of the present invention is designed to eliminate the difficulties attendant the production of this gasoline byproduct through the treating thereof to saturate the aromatic hydrocarbons, follower by conversion via pyrolysis to produce additional light olefins. Among the more significant advantages of this combinative process are the higher olefin yield per unit of charge stock, the conversion to extinction of the gasoline byproduct, the efficient use of byproduct hydrogen, a desulfurized saturated pyrolysis charge accompanied by a reduction in the acid gas removal requirements following pyrolysis. These and other advantages will become apparent from the following description of the present combination process.

A clear understanding of my invention will be facilitated by reference to the accompanying figure which illustrates one of the preferred embodiments. In this drawing, details such as pumps, compressors, instrumentation and controls, heat recovery circuits, miscellaneous valving, start-up lines and similar hardware, the design and application of which will be well within the purview of one skilled in the art, have been eliminated or reduced in number. These miscellaneous appurtenances are not believed necessary for a clear understanding of the present combinative process. With reference then to the accompanying drawing, the naphtha charge stock introduced through line 1 is a blend of heavy naphtha and kerosene fractions containing about 11.0% by volume of aromatics and about 400 p.p.m. (by weight) of sulfur. The naphtha charge is admixed with a hexane-plus recycle gasoline byproduct in line 2, the source of which is hereafter described, and a hydrogen-rich gas stream in line 3. The resulting mixture continues through line 2 into heater 7, wherein the temperature is raised to the level required for treating for the purpose of saturating aromatics and converting the sulfurous compounds into hydrocarbons and hydrogen sulfide. As illustrated in the drawing, the treating section consists of a two-reactor system and a high pressure separator. It is understood, however, that the scheme employed in treating the charge stock may be any process which effects the saturation of aromatic hydrocarbons, the restrutive removal of nitrogenous and sulfurous compounds and saturates the olefinic and di-olefinic hydrocarbons in the pyrolysis naphtha byproduct in line 2. This is preferably accomplished by using the system illustrated, wherein the first reactor 9 is at a temperature of from 150° F. to about 500° F., and the second reactor 12 is at a temperature in the range of 500° F. to about 800° F. The heated stream passes through line 8 into reactor 9, the effluent from which passes through lines 10 and 11 into reactor 12. Since the reactions effected are exothermic, the effluent from reactor 9 will be at a higher temperature than the charge to this reactor. However, it will be necessary to heat the reactor 9 effluent (not illustrated) prior to introducing it into reactor 12.

The catalyst in the reaction zones may be of the same, or different chemical and physical composition. Suitable catalysts are those which comprise at least one metallic component selected from the metals of Groups VI–B and VIII of the Periodic Table, and compounds thereof. Thus, the catalyst will contain at least one component from the group consisting of chromium, molybdenum, tungsten, iron, cobalt, nickel, ruthenium, rhodium, palladium, iridium, osmium and platinum. These are generally composited with a suitable refractory inorganic oxide including alumina, silica, zirconia, thoria, boria, titania, hafnia, strontia, mixtures of two or more, etc. Since the noble metals retain hydrogenation activity when in the sulfided form, they are generally preferred.

The reaction zones are maintained under an imposed pressure of from 300 to 2500 p.s.i.g., the liquid hourly space velocity therethrough being in the range of from 0.5 to about 10.0. The hydrogen being recycled in line 3 is of an amount such that the hydrogen to hydrocarbon mol ratio of the stream entering heater 7 is from 2:1 to about 20:1. The treated product effluent from reactor 12 passes through line 13 into separator 14, from which a gaseous phase rich in hydrogen is removed via line 3. Separator 14 operates at essentially the same pressure as reactors 9 and 12, allowing only for the normal pressure drop within the system. The temperature is such, however, that substantially all the condensable normally liquid hydrocarbons are removed through line 15. Pressure is maintained and controlled by venting a portion of the hydrogen-rich gaseous phase through line 4 containing control valve 5. The remainder of the gaseous phase, after removal of hydrogen sulfide, is recycled through line 3, by compressive means not shown, to combine with the liquid charge in line 2.

The treated product effluent in line 15 is not substantially changed from the liquid charge to reactor 9. That is, the boiling range of the effluent, comprising hexanes and heavier hydrocarbons, is not drastically different from the liquid charge, comprising hexanes and heavier hydrocarbons, being a combination of fresh charge from line 1 and byproduct recycle from line 2. There is, however, the possibiltiy of a small quantity of polymer product being in the stream passing from separator 14 through line 15. This polymer product passes through the pyrolysis reaction zone, and any unconverted portion thereof may be removed in the subsequent fractionation facilities. The sulfur concentration has been reduced to less than 1.0 p.p.m., and there is less than 1.0% by volume of aromatic hydrocarbons, and often less than 0.5%. Since the stream in line 15 contains some gaseous components: including carbon oxides, hydrogen sulfide, methane and a minor quantity of propane, etc., the same is passed into a low pressure separator 16 from which the gaseous components having fewer than three carbon atoms per molecule are removed as a flue gas stream through line 6. The flue gas also contains the gas vented from the treating section, for the purpose of pressure control, through line 4 containing control valve 5. The predominantly normally liquid stream passes through line 17 into pyrolysis unit 18, the latter at a temperature of about 1200° F. to about 2000° F. and at a pressure of from atmospheric to about 30.0 p.s.i.g. The pyrolyzed product effluent is passed through line 19 into fractionator 20.

Fractionator 20 is maintained and controlled at conditions of temperature and pressure such that an overhead fraction free from hexanes and heavier hydrocarbons is separated from the pyrolysis effluent for subsequent additional separation to recover the desired olefin product. This is illustrated in the drawing as taking place via line 21 and an olefin recovery system 22. The precise technique employed to recover the olefins from the stream separated in line 21, is not essential to my invention, and any suitable recovery system may be used. One such system is described in U.S. Pat. 3,267,028. The olefin recovery system functions to separate the olefinic product and also to provide a hydrogen-rich stream indicated as make-up hydrogen recycle in line 23. Further, a paraffin stream, in line 25, is separated and may be recycled to the pyrolysis unit. The product olefins are recovered via line 24. Generally, the makeup hydrogen recycle stream in line 23 will comprise from about 70.0%–80.0% hydrogen, 19.0% to 28.0% methane, up to 1.0% carbon oxides and up to 0.2% of $C_2$-hydrocarbons. In many instances, the total hydrogen supplied via lines 23 and 3 will be sufficient to sustain the hydrogenation reactions being effected in reactors 9 and 12, and the process may be considered as hydrogen self-sustaining. With particularly difficult charge stocks, it may be necessary to supplement the hydrogen from a suitable external source. In any event, however, such supplemental hydrogen will be of a minimal amount.

Depending upon the desired characteristics of the olefin-containing stream in line 21, a bottoms stream, normally liquid, leaving fractionator 20 through line 2, will be either a "hexane-and-heavier" stream, or a "pentane-and-heavier" stream. In most applications of my invention, as illustrated, the normally liquid stream being recycled via line 2 to combine with the naphtha charge will be a hexane-plus stream, and any pentanes in the pyrolysis effluent will be separated in the olefin recovery system 22 via line 25, along with propane and butanes. Although not illustrated in the drawing, the paraffin-rich stream in line 25 may be recycled directly to pyrolysis zone 18 for further conversion therein to low molecular weight olefins. When the treating section consists of a plurality of reaction zones, a portion of the hexane-plus recycle in line 2 may be combined with the charge to each of such reaction zones. This scheme is indicated in the drawing wherein a portion of the recycle in line 2 is diverted through line 11 to be introduced thereby into reactor 12.

The following specific example is presented for the purpose of further illustrating the means by which my invention may be conducted, and the benefits afforded through the utilization thereof. For the purpose of this example, a commercially scaled cracking plant will be described in combination with a treating unit consisting of two reaction zones in series flow. The charge stock is the naphtha-kerosene mixture used in conjunction with the description of the drawing. A more detailed analysis of this stock is given in the following Table I:

TABLE I

Naphtha-kerosene charge stock

| | |
|---|---|
| Gravity, °API @ 60° F. | 50.3 |
| ASTM distillation, ° F.: | |
| IBP | 275 |
| 5% | 305 |
| 30% | 349 |
| 50% | 375 |
| 70% | 406 |
| 90% | 452 |
| EP | 496 |
| Component analysis, vol. %: | |
| Paraffins plus naphthenes | 86.1 |
| Olefins | 2.9 |
| Aromatics | 11.0 |

The charge has an average molecular weight of about 155, and is contaminated by the inclusion of about 380 p.p.m. (by weight) of sulfur. The charge stock is admixed with 4,000 b./d. (barrels per day) of a pyrolysis gasoline product containing about 70.0% by volume of aromatic hydrocarbons and having an end boiling point of about 360° F. The pyrolysis gasoline recycle is obtained from a pyrolysis effluent which has been substantially depentanized. As indicated by a bromine number of 32.6 and a diene value of 23.4, the pyrolysis liquid contains significant amounts of mono- and di-olefins. The total liquid charge to the reactor system is 13,350 b./d., and this is admixed with hydrogen to provide a hydrogen concentration of about 1500 s.c.f./b. (standard cubic feet per barrel).

The reaction zones are maintained at a pressure of about 800 p.s.i.g., and the temperature is controlled to provide a maximum catalyst bed temperature (measured at the outlet of the second reactor) of 825° F. The reaction zone effluent, in an amount of about 13,450 b./d. contains 99.4 volume percent paraffins and naphthenes, 0.03 volume percent olefins and 0.57 volume percent aromatics. The sulfur concentration is less than 1.0 p.p.m., the diene value is less than 0.3 and the bromine number is about 0.15. The effluent is separated to provide a gaseous phase containing hydrogen, hydrogen sulfide, carbon oxides and a minor quantity of methane, ethane and propane. After removal of the hydrogen sulfide and carbon oxides, the gaseous phase is recycled to combine with the liquid charge to the reactor. This initial separation is effected at a pressure of about 750 p.s.i.g. and a temperature of about 100° F. The normally liquid hydrocarbons are then further separated in a low-pressure separator operating at about 45 p.s.i.g. to remove additional absorbed hydrogen sulfide and carbon oxides which are vented from the system as flue gas. The remaining liquid hydrocarbons, having a boiling range of about 245° F. to about 495° F. are passed into a thermal cracking zone at a temperature of 1385° F. and a pressure of about 15 p.s.i.g.

The product effluent from the thermal cracking zone is fractionated at conditions of temperature and pressure to provide a depentanized liquid stream having an end boiling point of about 400° F. This liquid stream, in an amount of about 4,000 b./d., is recycled to combine with 9,350 b./d. of the fresh naphtha-kerosene charge as previously described. The depentanized overhead fraction has the composition indicated in the following Table II:

TABLE II

Olefin-containing product

| Component: | Mol. percent |
| --- | --- |
| Light nonhydrocarbons | 0.4 |
| Hydrogen | 14.3 |
| Methane | 26.4 |
| Acetylene | 0.4 |
| Ethylene | 28.0 |
| Ethane | 6.4 |
| Propylene | 13.3 |
| Propane | 0.9 |
| $C_4$-olefins | 6.8 |
| Butane | 0.3 |
| Pentane | 2.8 |

The $C_4$-olefins include isobutylene, butene-1 and butene-2.

Following separation of this material by the technique detailed in U.S. Pat. 3,267,028, modified to concentrate the hydrogen in a steam comprising about 70.0% hydrogen, 28.0% methane and about 2.0% $C_2$-hydrocarbons with a trace of carbon oxides, the propane, butane and pentane stream is recycled to the pyrolysis unit in an amount of about 365 b./d., and the hydrogen-rich stream is recycled to combine the charge to the treating zone. The olefinic product concentrate is recovered in an amount of about 4600 b./d., and consists of 2610 b./d. of ethylene, 1245 b./d. of propylene and 745 b./d. of total $C_4$-olefins.

The foregoing example and specification illustrate the method by which the present process is effected, and the benefits to be afforded the utilization thereof. The gasoline byproduct, otherwise often difficult to use economically, has been eliminated; efficient use has been made of the byproduct hydrogen; a desulfurized feed is provided the pyrolysis unit; and, there has been an elimination of the acid-gas removal facilities usually required after a pyrolysis operation.

I claim as my invention:

1. A process for producing low molecular weight olefinic hydrocarbons which comprises the steps of:
    (a) treating a hydrocarbon charge stock containing aromatic hydrocarbons and having an end boiling point up to about 425° F., in contact with a catalytic composite containing a hydrogenation metallic component, and at conditions selected to saturate aromatic hydrocarbons;
    (b) separating the resulting treated effluent to provide a hydrogen-rich gaseous phase and a liquid phase;
    (c) recycling said gaseous phase, at least in part, to combine with said charge stock;
    (d) subjecting said liquid phase to thermal cracking at conditions, including a temperature of about 1200° F. to about 1500° F., selected to convert said liquid phase into lower boiling hydrocarbons;
    (e) removing a hydrocarbon stream substantially free of hexane and heavier hydrocarbons from the thermally-cracked product effluent; and,
    (f) separating said stream into a hydrogen-rich gaseous phase, recycling said gaseous phase to combine with said charge stock, and recovering said low molecular weight olefinic hydrocarbons from the remainder of said stream.

2. The process of claim 1 further characterized in that said charge stock is a light naphtha hydrocarbon fraction.

3. The process of claim 1 further characterized in that said charge stock is a heavy naphtha fraction.

4. The process of claim 1 further characterized in that said treating is conducted at conditions including a pressure in the range of about 300 to 2500 p.s.i.g.

5. The process of claim 1 further characterized in that said treated effluent is first separated at substantially the pressure at which said treating is conducted, to provide a hydrogen-rich gaseous phase, the remainder of said effluent being hereafter separated at a reduced pressure of from atmospheric to about 50 p.s.i.g.

6. A process for producing low molecular weight olefins which comprises the steps of:
    (a) treating a hydrocarbon charge stock containing aromatic hydrocarbons and long chain di-olefinic hydrocarbons and having an end boiling point up to about 425° F. in contact with a catalytic composite containing a Group VIII hydrogenation metallic component, and at conditions including a temperature in the range of from about 150° F. to about 850° F. and a pressure of from about 300 to about 2500 p.s.i.g., said conditions selected to saturate said aromatic and di-olefinic hydrocarbons;
    (b) separating the resulting treated effluent at a pressure substantially the same as that at which said treating is conducted, to provide a hydrogen-rich gaseous phase and recycling the latter to combine with said charge stock;
    (c) further separating the remainder of said treated effluent at a reduced pressure less than about 50 p.s.i.g. to remove normally gaseous components having fewer than about three carbon atoms per molecule;
    (d) thermal cracking the remaining portion of the treated effluent at a temperature of from about 1200° F. to about 1500° F.;
    (e) removing an olefin-rich, normally gaseous stream, substantially free from hydrocarbons containing more than six carbon atoms per molecule, from the thermally-cracked product effluent;
    (f) separating said gaseous stream to provide a hydrogen-rich gas and recycling the same to combine with said charge stock; and,
    (g) recycling at least a portion of the remaining cracked product effluent to combine with said charge stock.

7. The process of claim 6 further characterized in that said catalytic composite contains at least one metallic component from the group of Group VIII noble metals and compounds thereof.

8. The process of claim 6 further characterized in that said charge stock is treated in a plurality of reaction zones, and a portion of said cracked product effluent is combined with the charge to each reaction zone.

References Cited

UNITED STATES PATENTS

| 1,703,949 | 3/1929 | Norwood | 260—683 |
| 2,093,843 | 9/1937 | McKee | 208—57 |
| 2,339,246 | 1/1944 | Bates et al. | 208—57 |
| 3,203,889 | 8/1965 | Pollitzer et al. | 208—57 |
| 3,306,844 | 2/1967 | Brierley et al. | 260—683 |

DELBERT E. GANTZ, Primary Examiner

C. E. SPRESSER, Jr., Assistant Examiner

U.S. Cl. X.R.

208—57, 89